(12) United States Patent
DeBlock et al.

(10) Patent No.: US 12,009,501 B2
(45) Date of Patent: Jun. 11, 2024

(54) FABRICATION OF POROUS ELECTRODES BY FUSION OF SILVER PARTICLES

(71) Applicant: The Government of the United States of America, as represented by the Secretary of the Navy, Arlington, VA (US)

(72) Inventors: Ryan H. DeBlock, Alexandria, VA (US); Debra R. Rolison, Arlington, VA (US); Jeffrey W. Long, Alexandria, VA (US); Zachary G. Neale, Alexandria, VA (US)

(73) Assignee: The Government of the United States of America, as represented by the Secretary of the Navy, Arlington, VA (US)

( * ) Notice: Subject to any disclaimer, the term of this patent is extended or adjusted under 35 U.S.C. 154(b) by 0 days.

(21) Appl. No.: 18/328,020

(22) Filed: Jun. 2, 2023

(65) Prior Publication Data

US 2023/0307604 A1    Sep. 28, 2023

Related U.S. Application Data

(63) Continuation-in-part of application No. 18/154,078, filed on Jan. 13, 2023, now Pat. No. 11,710,818.

(60) Provisional application No. 63/299,071, filed on Jan. 13, 2022.

(51) Int. Cl.
  *H01M 4/04*    (2006.01)
  *H01M 4/48*    (2010.01)
  *H01M 10/32*   (2006.01)

(52) U.S. Cl.
  CPC .......... *H01M 4/0433* (2013.01); *H01M 4/48* (2013.01); *H01M 10/32* (2013.01)

(58) Field of Classification Search
  CPC .................................................. H01M 4/0433
  See application file for complete search history.

(56) References Cited

U.S. PATENT DOCUMENTS

| | | | | |
|---|---|---|---|---|
| 3,972,729 A | * | 8/1976 | Mosetti ............... | H01M 4/0419 252/182.1 |
| 2014/0186663 A1 | * | 7/2014 | Hiroki ................. | H01M 50/394 429/57 |

OTHER PUBLICATIONS

CN86102501A and translation (Year: 2023).*

* cited by examiner

*Primary Examiner* — Brian R Ohara
(74) *Attorney, Agent, or Firm* — US Naval Research Laboratory; Joseph T. Grunkemeyer

(57) ABSTRACT

A method of making an electrode by providing a mixture of first particles of silver or silver oxide and second particles of an inorganic porogen, molding the mixture, cohering the mixture to form a green body, demolding the green body, heating the green body to form a monolith, to convert any silver oxide to silver, and to fuse the first particles together, and submerging the monolith in a liquid that removes the second particles.

10 Claims, 14 Drawing Sheets

FABRICATION OF POROUS ELECTRODES BY FUSION OF SILVER PARTICLES

This application is a continuation-in-part application of U.S. application Ser. No. 18/154,078, filed on Jan. 13, 2023, which claims the benefit of U.S. Provisional Application No. 63/299,071, filed on Jan. 13, 2022. The provisional application and all other publications and patent documents referred to throughout this nonprovisional application are incorporated herein by reference.

TECHNICAL FIELD

The present disclosure is generally related to silver electrodes for electrochemical devices.

DESCRIPTION OF RELATED ART

Zinc electrodes historically have had limited cycle life due to operando formation of dendrites that short-circuit the battery when they grow long enough to pierce the cell's separator and make electrical contact with the opposing electrode. Related problems of electrode degradation also plague the silver/silver oxide cathodes that are used in alkaline Ag—Zn batteries. A solution to this dendrite-forming problem is to fabricate the Zn anode as an aperiodic pore—solid architecture in which the 3D-interconnected void volume is co-continuous with the 3D-interconnected solid zinc network, i.e., a "sponge" form factor (Hopkins et al. (2020) *Sustain. Energy and Fuels* 4, 3363-3369; Hopkins et al. (2020) *Energy Storage Mater.* 27, 370-376; Hopkins et al. (2020) *J. Vis. Exp.* (163); Ko et al. (2018) *ACS Appl. Energy Mater.* 2, 212-216; Parker et al. (2017) *Science* 356, 415-418; Parker et al. (2016) *J. Electrochem. Soc.* 163, A351—A355; Parker et al. (2014) *Energy Environ. Sci.* 7, 1117-1124). The metallic, conductive, three-dimensional pathways improve current distribution throughout the electrode structure and avoid uneven reaction loci where formation of dendrites is likely to occur during charge—discharge cycles. In addition, the void network intertwined around the 3D zinc scaffold allows for confined volume elements with high ratios of surface (zinc) to volume (electrolyte); confinement induces saturation of zincate at lower concentrations than occurs in open solution; thus dehydration to zinc oxide (ZnO) occurs earlier in the discharge process, thereby further minimizing shape change.

These previous Zn-sponge fabrication protocols used emulsion-based compositions that required organic pore-forming agents (carboxymethyl cellulose (CMC) or cornstarch). After drying and consolidation of the zinc-porogen object and subsequent thermal processing under inert gas flow (nitrogen or argon), the organic porogen must then be removed by heating in an oxygen-containing environment, typically air, causing excess oxidation of zinc to zinc oxide. The entire process is conducted in a furnace and takes ~10 hours for tube purging, thermal ramping, and cooling.

BRIEF SUMMARY

Disclosed herein is a method comprising: providing a mixture comprising first particles comprising silver or silver oxide and second particles comprising an inorganic porogen, molding the mixture, cohering the mixture to form a green body, heating the green body to form a monolith, to convert any silver oxide to silver, and to fuse the first particles together, and submerging the monolith in a liquid that removes the second particles.

Also disclosed herein is an electrode made by a method comprising: providing a mixture comprising first particles comprising silver or silver oxide and second particles comprising an inorganic porogen, molding the mixture, cohering the mixture to form a green body, heating the green body to form a monolith, to convert any silver oxide to silver, and to fuse the first particles together, and submerging the monolith in a liquid that removes the second particles.

BRIEF DESCRIPTION OF THE DRAWINGS

A more complete appreciation will be readily obtained by reference to the following Description of the Example Embodiments and the accompanying drawings.

electrolyte: 9 M KOH; separators: Freudenberg non-woven, Celgard 3501. Discharged at 10 mA cm$^{-2}$.

Figure 12:
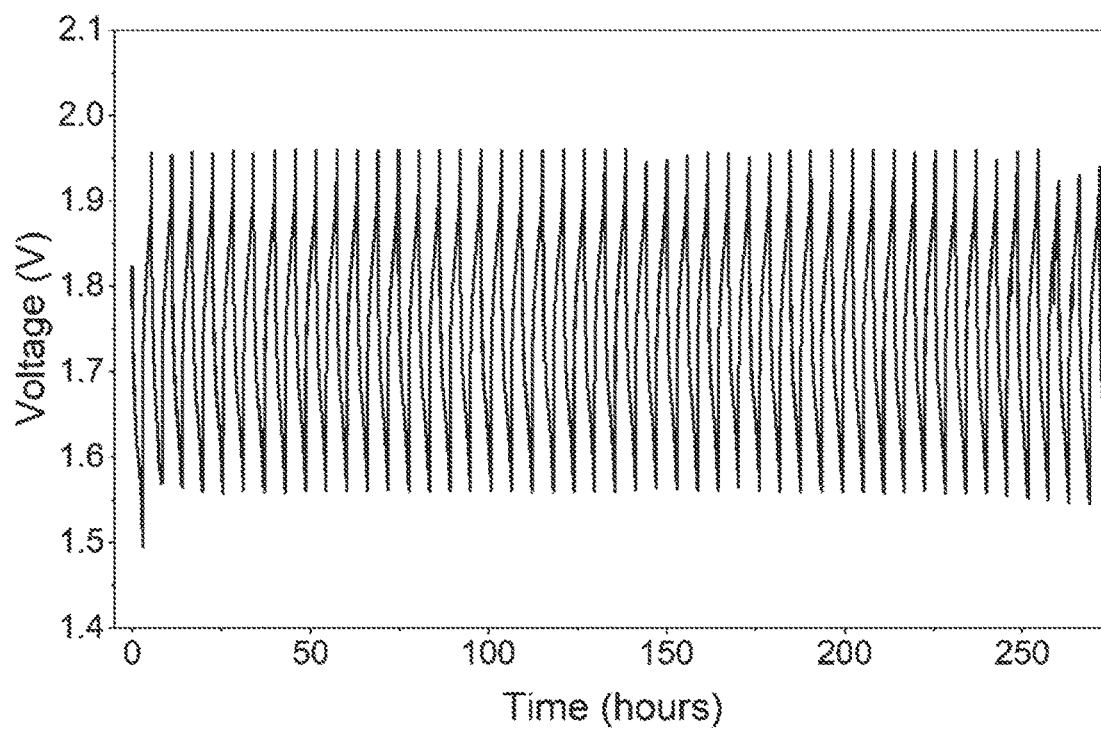

FIG. 12 shows discharge capacity retention as a function of cycle for a Ni—Zn cell. Cathode: Harvested NiOOH from a commercial Ni—Zn battery (PK cell); anode: zinc sponge electrode fabricated according to Method 2 before zinc acetate removal; electrolyte: 6 M KOH, 1 M LiOH; separators: Freudenberg non-woven, Celgard 3501. Discharged at 10 mA cm$^{-2}$. Areal current density defined by the geometric area of the zinc sponge electrode.

Figure 13:
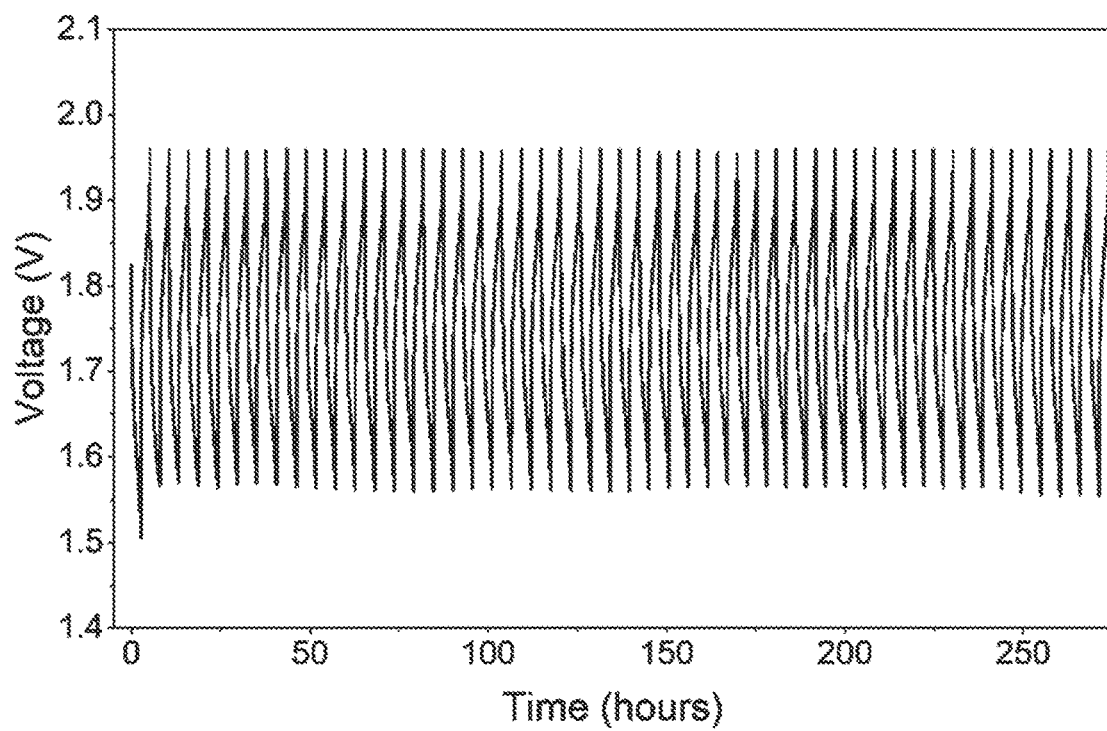

FIG. 13 shows discharge capacity retention as a function of cycle for a Ni—Zn cell. Cathode: Harvested NiOOH from a commercial Ni—Zn battery (PK cell); anode: zinc sponge electrode fabricated according to Method 2 after zinc acetate removal; electrolyte: 6 M KOH, 1 M LiOH; separators: Freudenberg non-woven, Celgard 3501. Discharged at 10 mA cm$^{-2}$. Areal current density defined by the geometric area of the zinc sponge electrode.

Figure 14:
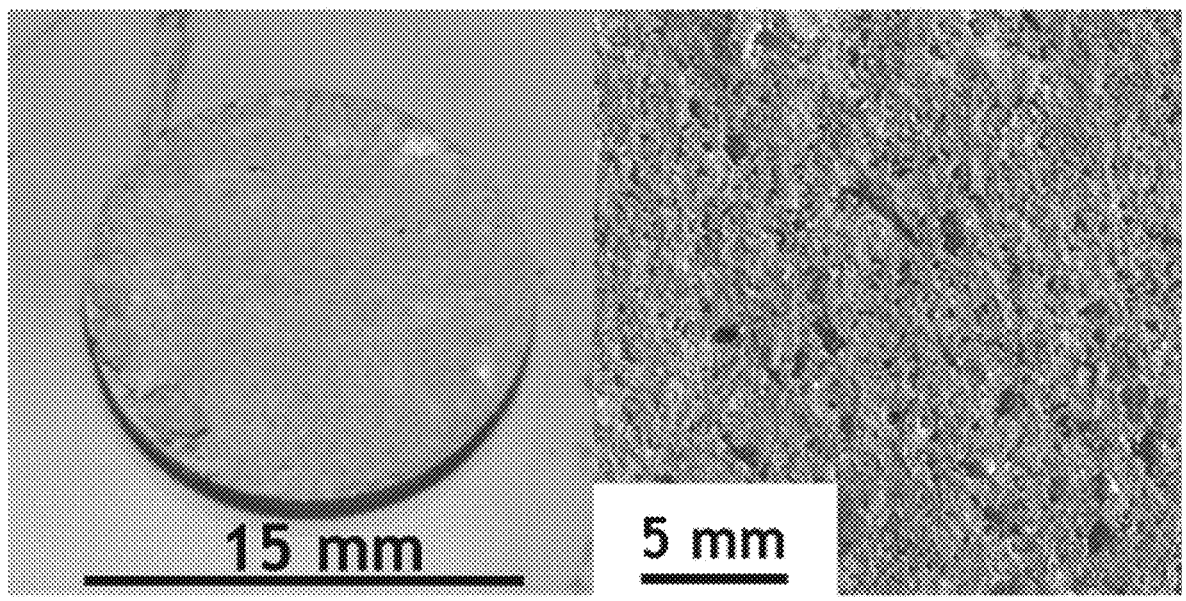

FIG. 14 shows photographs of a silver sponge electrode.

Figure 15:
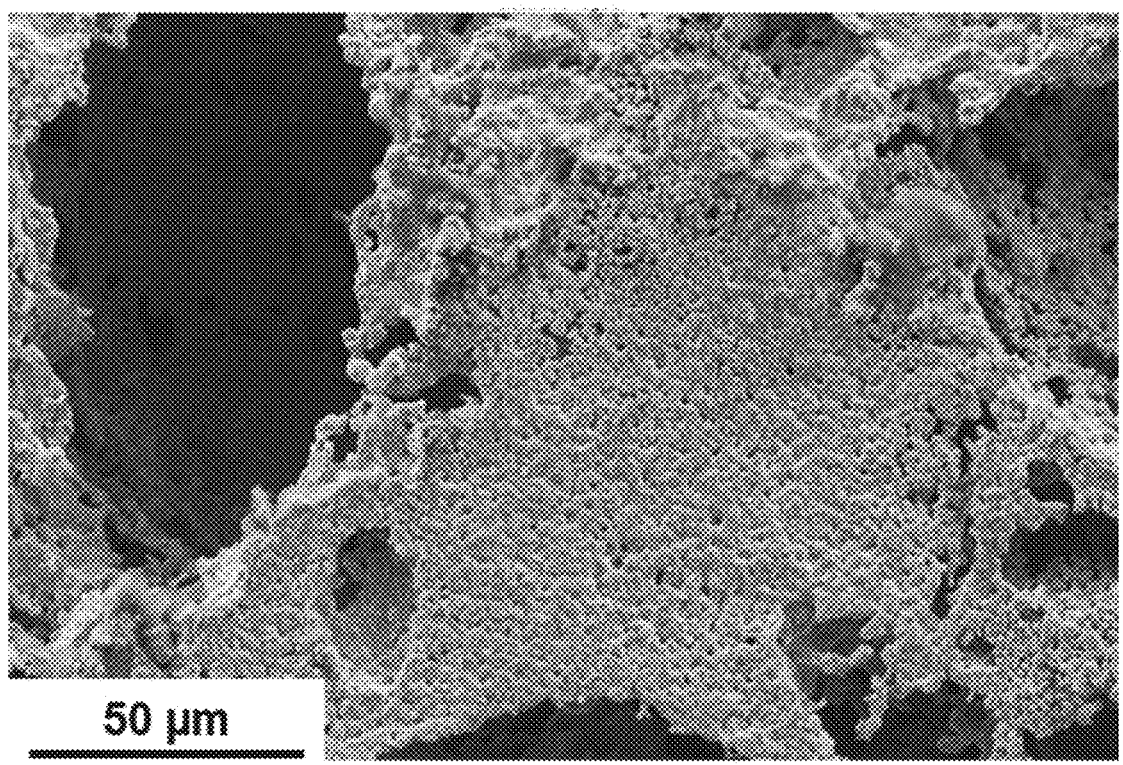

FIG. 15 shows a scanning electron micrograph of the internal silver sponge surfaces.

Figure 16:
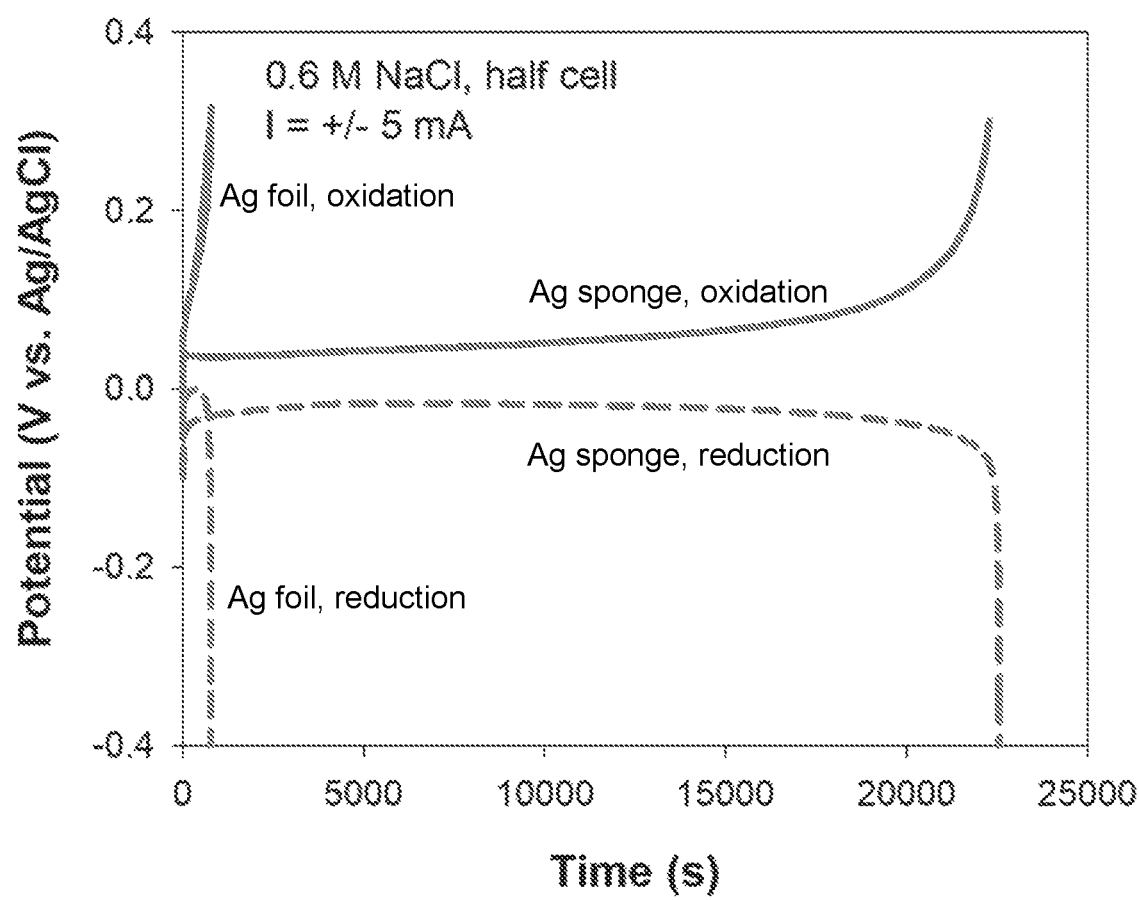

FIG. 16 shows a comparison of the electrochemical (de)chloridation of silver sponge and silver foil in a half-cell configuration. Working electrode: silver, counter electrode: Pt wire, reference electrode: Ag|AgCl.

Figure 17:
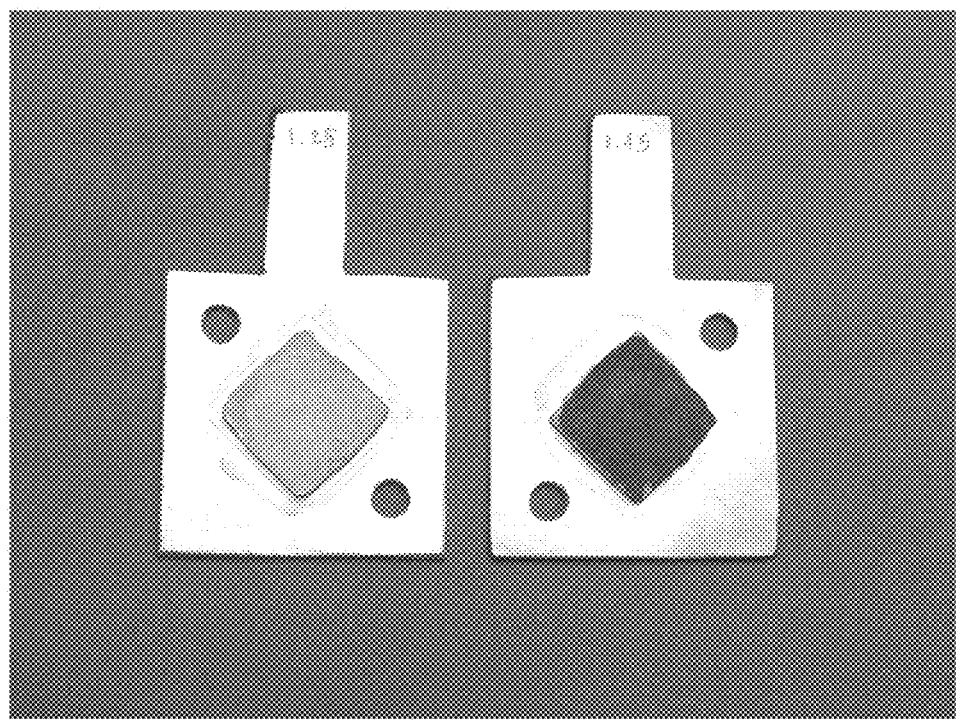

FIG. 17 shows a photograph of (left) a silver-sponge electrode and (right) a chemically chloridated silver-sponge electrode on titanium current collectors. Electrodes are 2.5 cm×2.5 cm.

Figure 18:
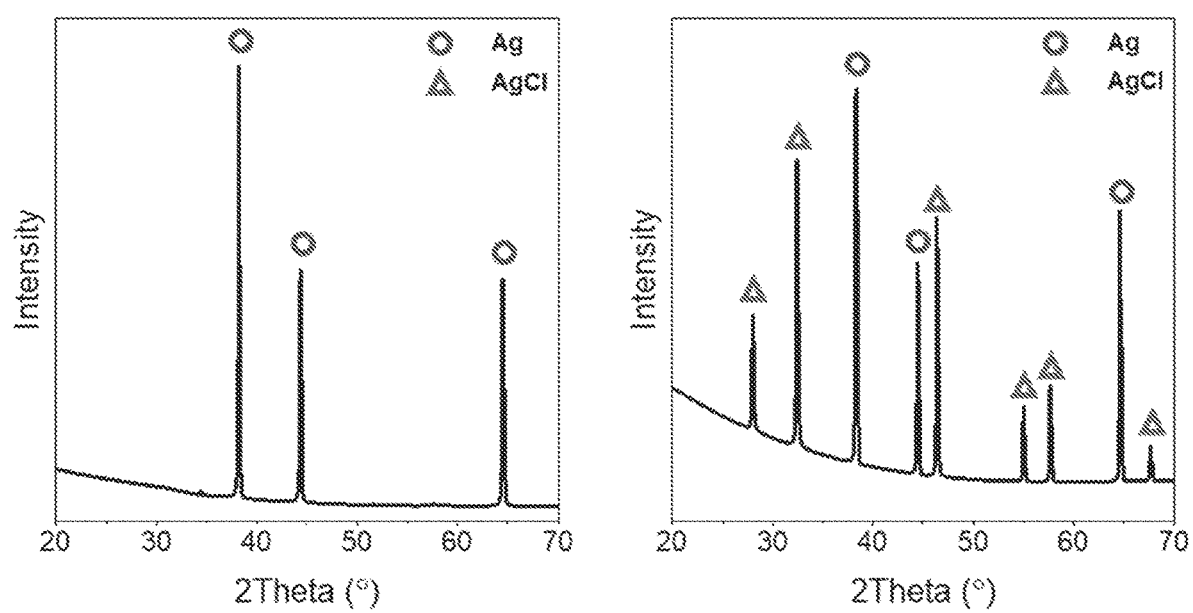

FIG. 18 shows X-ray diffraction patterns of silver sponge (left) and chemically chloridated silver sponge (right).

Figure 19:
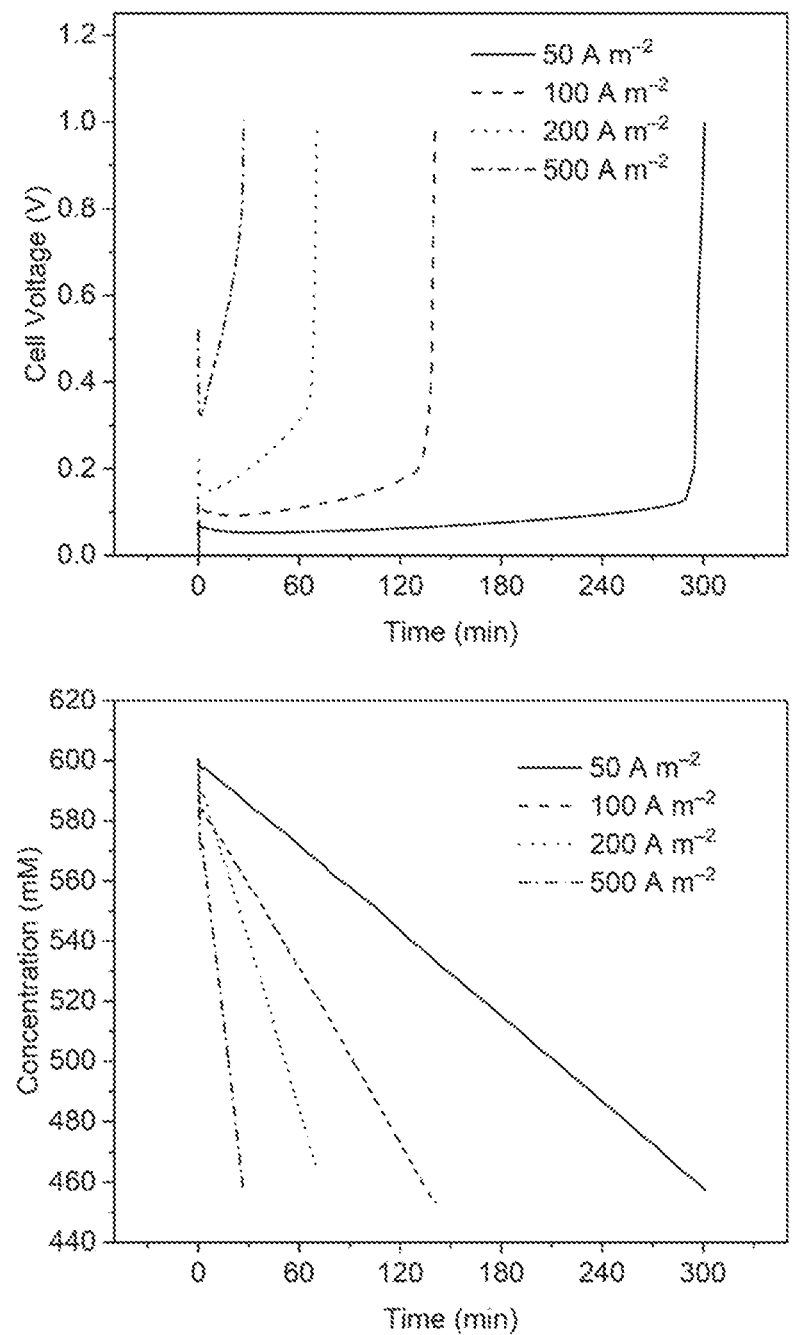

FIG. 19 shows electrochemical response of a symmetric cell (AgCl@Ag sponge vs. Ag sponge) in flowing 600 mM NaCl at various applied current density (top) and concurrent desalination response in terms of changing NaCl concentration (bottom).

Figure 20:
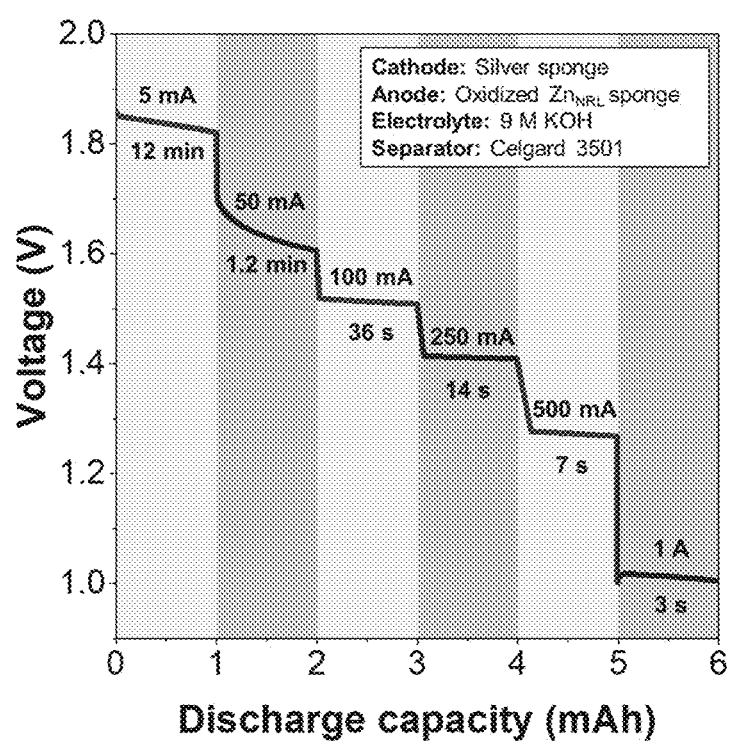

FIG. 20 shows the electrochemical discharge of a 5 cm$^2$ Ag-sponge/Zn-sponge cell at various currents in steps of 1 mAh.

DETAILED DESCRIPTION OF EXAMPLE EMBODIMENTS

In the following description, for purposes of explanation and not limitation, specific details are set forth in order to provide a thorough understanding of the present disclosure. However, it will be apparent to one skilled in the art that the present subject matter may be practiced in other embodiments that depart from these specific details. In other instances, detailed descriptions of well-known methods and devices are omitted to not obscure the present disclosure with unnecessary detail.

Herein, is disclosed a synthesis method that utilizes a thermally stable, inorganic pore-former to create the interconnected zinc architecture. The inorganic porogen is removed chemically after a simplified thermal treatment at lower temperatures. The incorporation of a thermally stable inorganic porogen significantly reduces the heat-treatment time and synthesis cost. In a second variation, synthesis cost and time are reduced by chemically sintering zinc particles together into a monolithic object, thereby minimizing or eliminating the need for additional thermal treatment.

In a first method, a mixture is made of particles comprising zinc, water, a water-soluble thickener, and inorganic porogen particles. The zinc particles may be, for example, any that are described in U.S. Pat. Nos. 9,802,254; 10,008,711; 10,720,635; 10,763,500; 10,804,535; 11,069,889; 11,296,373; and 11,670,759.

The water-soluble thickener may be, for example, a carboxymethylcellulose. The porogen particles are water-insoluble, and may comprise, for example, calcium carbonate, magnesium carbonate, and magnesium oxide. The porogen may be thermally stable in air up to 600° C., and be easily removable post-thermal processing.

Next, the mixture is placed in a mold and the water evaporated to form a monolith. The monolith is then heated to fuse the zinc particles together. The heating step may, for example, be performed by heating at no more than 600° C. for no more than 2 hours.

After heating, the monolith is submerged in a liquid that removes the porogen particles. The liquid may be, for example, aqueous hydrochloric acid for removing calcium carbonate particles.

In a second method, the zinc particles are mixed with an aqueous acetic acid solution and porogen particles. Acetic-acid treatment of the zinc powder can happen before, during, and/or after mixing with the appropriate porogen for chemical sintering. The porogen particles may comprise, for example, zinc acetate dihydrate, a halide salt (NaCl, KCl, etc.), urea, calcium carbonate, or other highly water-soluble compounds.

As above, the mixture is placed in a mold and the water evaporated to form a monolith. The heating step is not necessary to fuse the zinc particles, due to the acetic acid and zinc acetate dihydrate. The monolith is then submerged in a liquid that removes the porogen particles. The liquid may be, for example, water, ethanol, or aqueous hydrochloric acid. Optionally, the monolith is then heated at a temperature below the melting point of zinc.

Other variations and parameters of these methods may be incorporated from those disclosed in U.S. Pat. Nos. 9,802,254; 10,008,711; 10,720,635; 10,763,500; 10,804,535; 11,069,889; and 11,296,373.

An aspect of this synthetic protocol is the use of $CaCO_3$ as an inorganic porogen to fabricate porous zinc electrodes. Calcium carbonate is used because of its thermal stability and high solubility in aqueous acid—the former permits taking zinc above its melting point while the thermally recalcitrant $CaCO_3$ retains the form factor and the latter allows facile removal after thermal processing. Previous generations of zinc-sponge fabrication methods in the art use organic porogens, which must be removed with high-temperature oxidative treatment. In those prior examples, once those porogens are removed, only air remains to diffuse heat into the zinc structure, a condition that may lead to inhomogeneous internal heating of the zinc object. Because the thermal conductivity of $CaCO_3$ (2.25 W/mK) is ~100× greater than that of air (0.025 W/mK), having $CaCO_3$ infused in the voids of the zinc monolith throughout the thermal processing disperses heat more uniformly within the zinc object to enhance the fusion of individual zinc particles into a mechanically cohesive network. The result is a zinc sponge that is equal to or greater than one derived from organic porogen-based methods in terms of mechanical strength, integrity, and handleability, while also employing simpler and shorter thermal processing steps. In addition, the use of hydrochloric acid (HCl) to remove $CaCO_3$ after thermal treatment also dissolves some surface ZnO that forms during heating. For some zinc rechargeable battery configurations (Ag—Zn, Zn-air, Zn—$MnO_2$), it is desirable that the sponge have relatively low ZnO content when first incorporated into the battery.

The following examples are given to illustrate specific applications. These specific examples are not intended to limit the scope of the disclosure in this application.

Method 1: Inorganic Template Plus One-Step Thermal Treatment in Air

Figure 1:
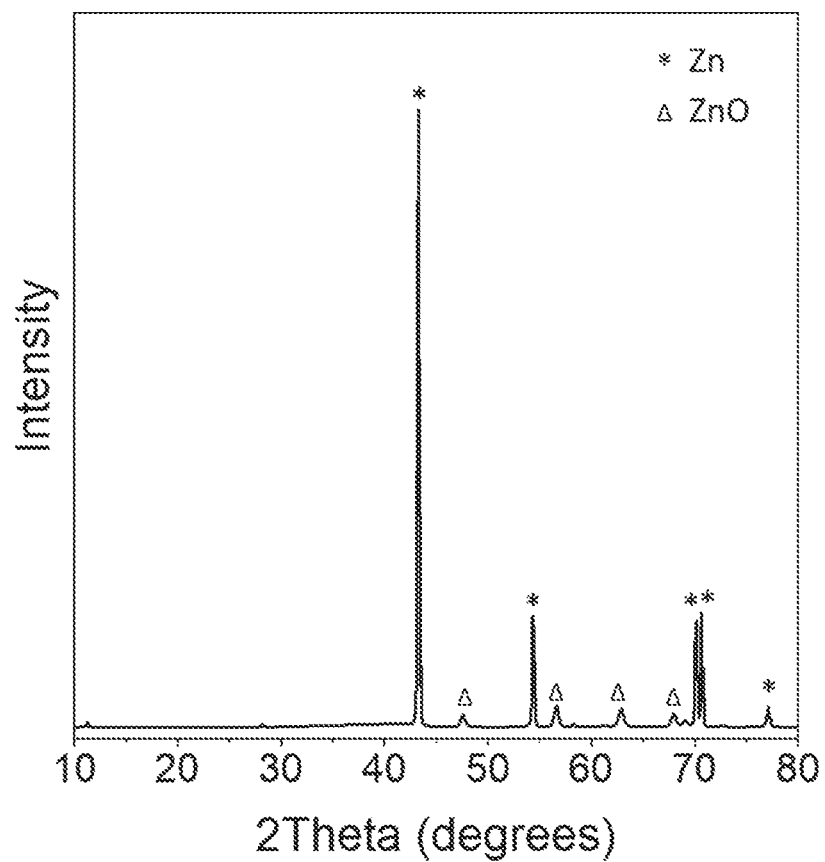
FIG. 1 shows X-ray diffraction (XRD) pattern of zinc monolith (Method 1) after thermal treatment (580° C., 1 h) and 10 min washing in 1M HCl.

In one embodiment, 8 mL of 18 MΩ·cm water is mixed with 80 mg of high viscosity CMC thickener (Sigma Aldrich, C5013). Separately, 3.0 g of calcium carbonate ($CaCO_3$) is dry-mixed with 65 g of 50 μm zinc (Zn) powder. After achieving uniform mixtures, the dry powders are mixed into the CMC-thickened water solution until homogenous. The viscous paste is then molded into the desired shape and dried overnight at 50-70° C. For zinc particle fusion, the dried monoliths are placed in an alumina crucible and then into a preheated box furnace set to 580° C. for 1 h. After this period, the samples are removed from the furnace to cool to room temperature. In order to remove the $CaCO_3$ porogen, the heat-treated, Zn monoliths are submerged in 1 M HCl for 5-10 min and then rinsed with copious amounts of water followed by ethanol. After thermal treatment and acid washing, the zinc architectures comprise ~85% metallic zinc and ~15% zinc oxide (ZnO) by weight, according to Reference Intensity Ratio (RIR) fitting of XRD patterns (FIG. 1).

Figure 2:
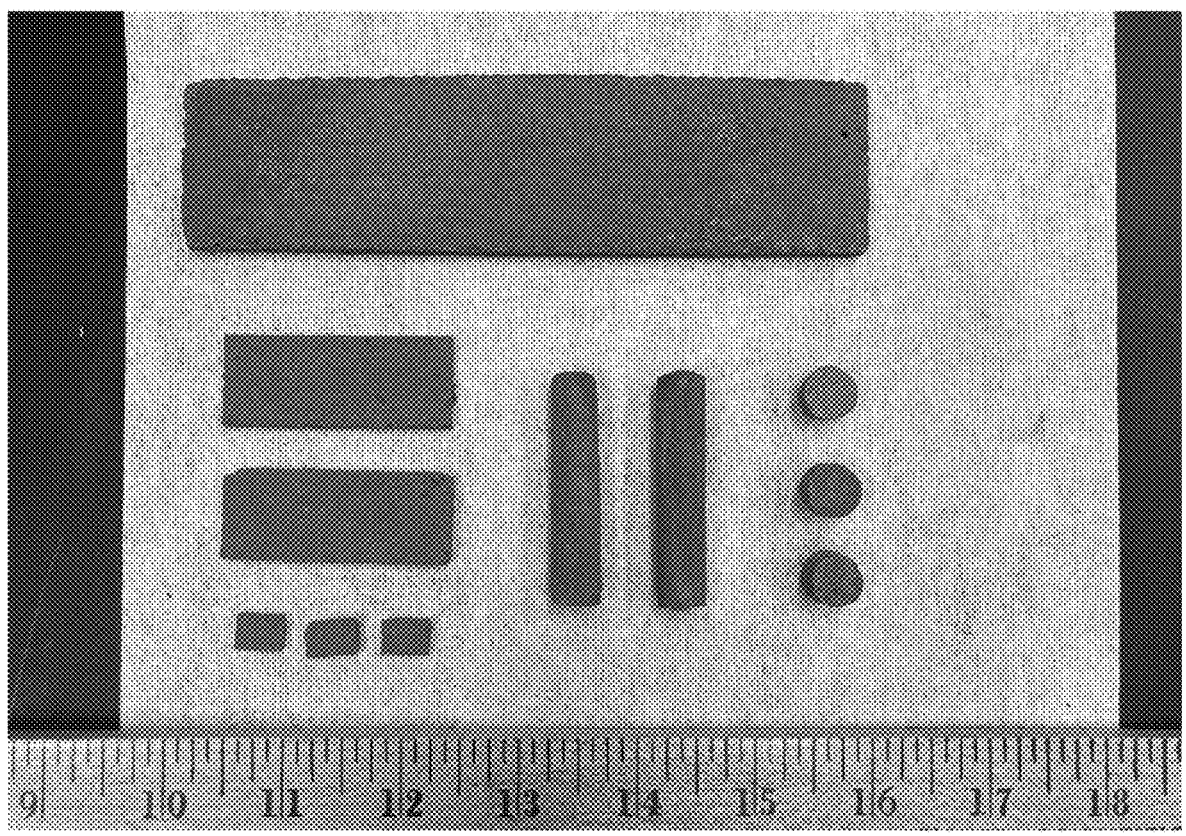
FIG. 2 shows a photograph of Zn sponge monoliths fabricated using an inorganic porogen (Method 1) as molded into different form factors.
Figure 3:
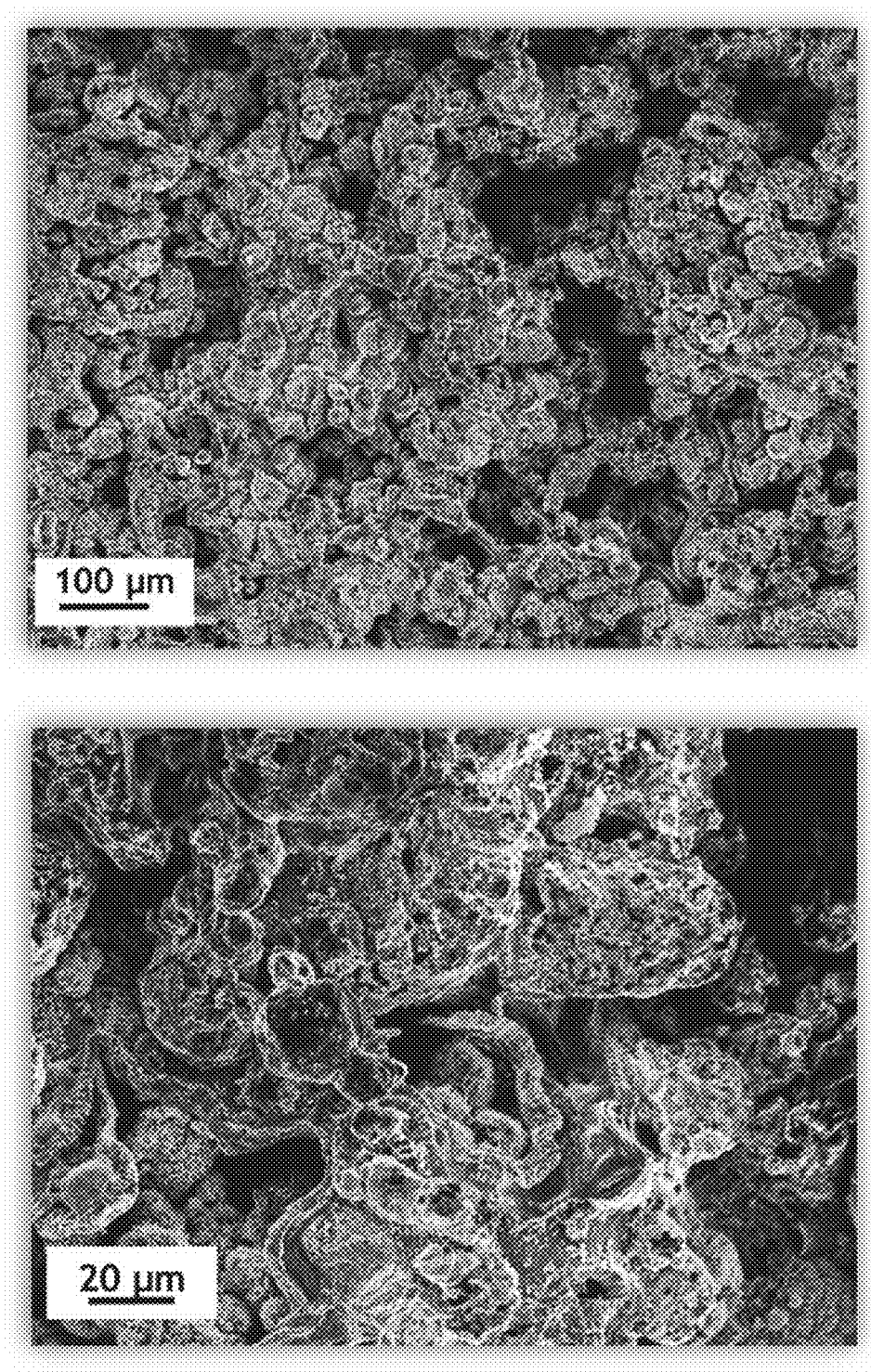
FIG. 3 shows scanning electron micrographs of zinc monoliths synthesized by Method 1. The micrographs show internal surfaces that were exposed by removing slices from rod-shaped zinc monoliths.

The ultimate form factor of the final monolith derives primarily from the dimensions of the initial mold used to contain the viscous paste derived from the Zn sponge precursors; various examples prepared in our laboratory are shown in FIG. 2. Scanning electron micrographs (FIG. 3) of cross-sectional cuts depict well-fused and interconnected zinc particles.

Figure 4:
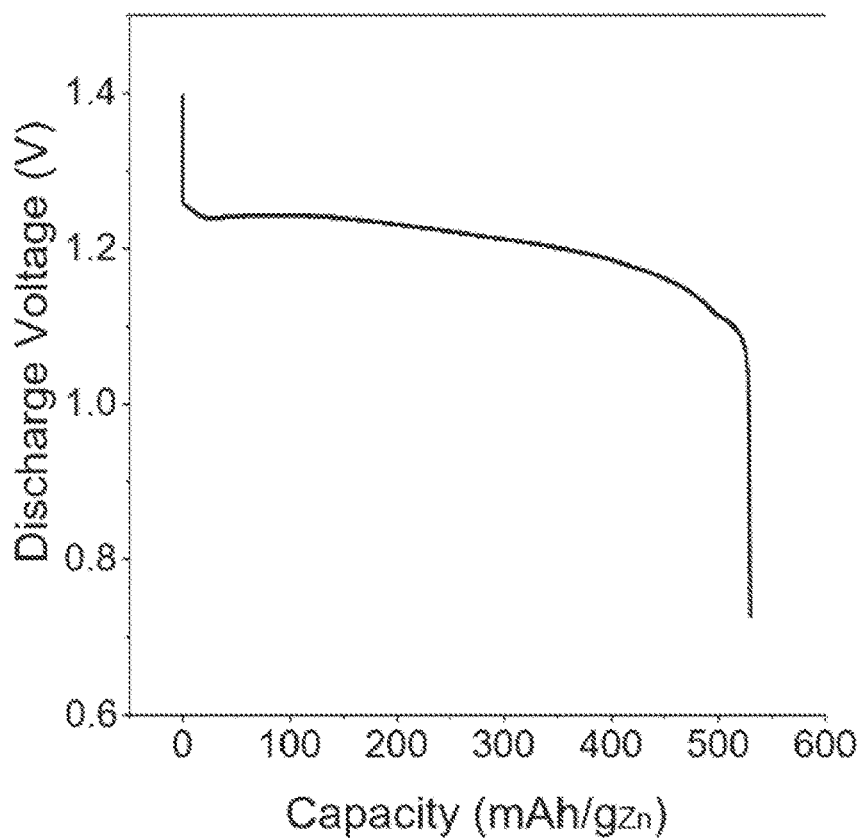
FIG. 4 shows primary discharge of zinc electrode in a Zn—air cell. Cathode: 4:1:1 mixture acetylene black carbon:cryptomelane MnOx aerogel catalyst:PTFE binder; anode: zinc sponge electrode fabricated according to Method 1; electrolyte: 9 M KOH; separators: Freudenberg non-woven, Celgard 3501. Discharged at 10 mA cm$^{-2}$.
Figure 5:
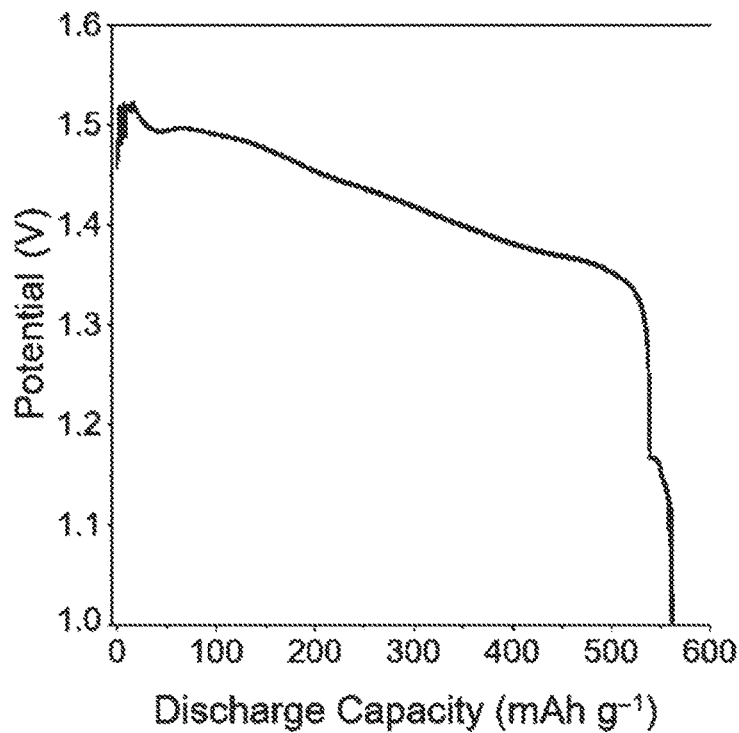
FIG. 5 shows primary discharge of zinc electrode in an Ag—Zn cell. Cathode: Silver oxide (primarily AgO); anode: zinc sponge electrode fabricated according to Method 1; electrolyte: 9 M KOH; separators: 2× cellophane, Freudenberg non-woven, Celgard 3501. Discharged at 10 mA cm$^{-2}$.
Figure 6:
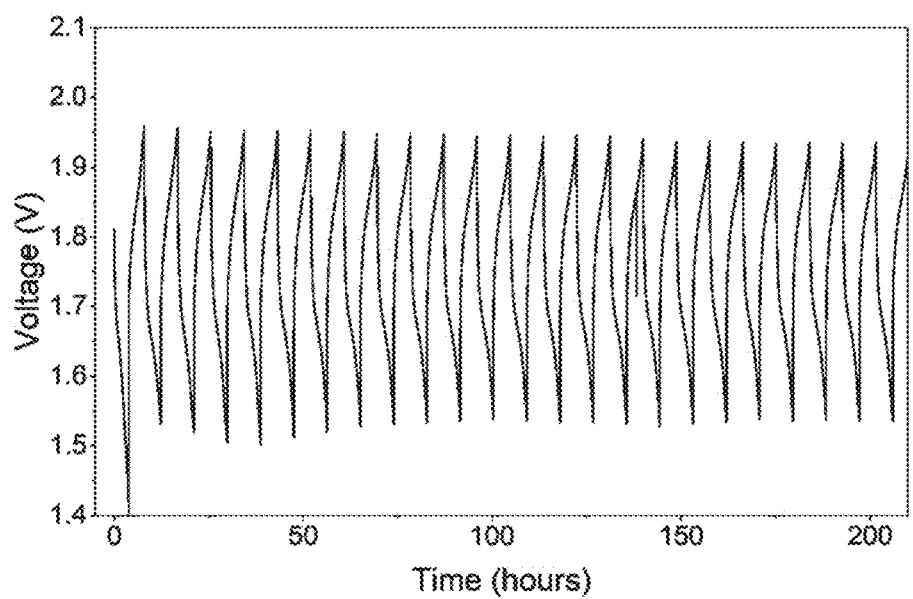
FIG. 6 shows discharge capacity retention as a function of cycle for a Ni—Zn cell. Cathode: Harvested NiOOH from a commercial Ni—Zn battery (PK cell); anode: zinc sponge electrode fabricated according to Method 1; electrolyte: 6 M KOH, 1 M LiOH; separators: Freudenberg non-woven, Celgard 3501. Discharged at 10 mA cm$^{-2}$. Areal current density defined by the geometric area of the zinc sponge electrode.
Figure 7:
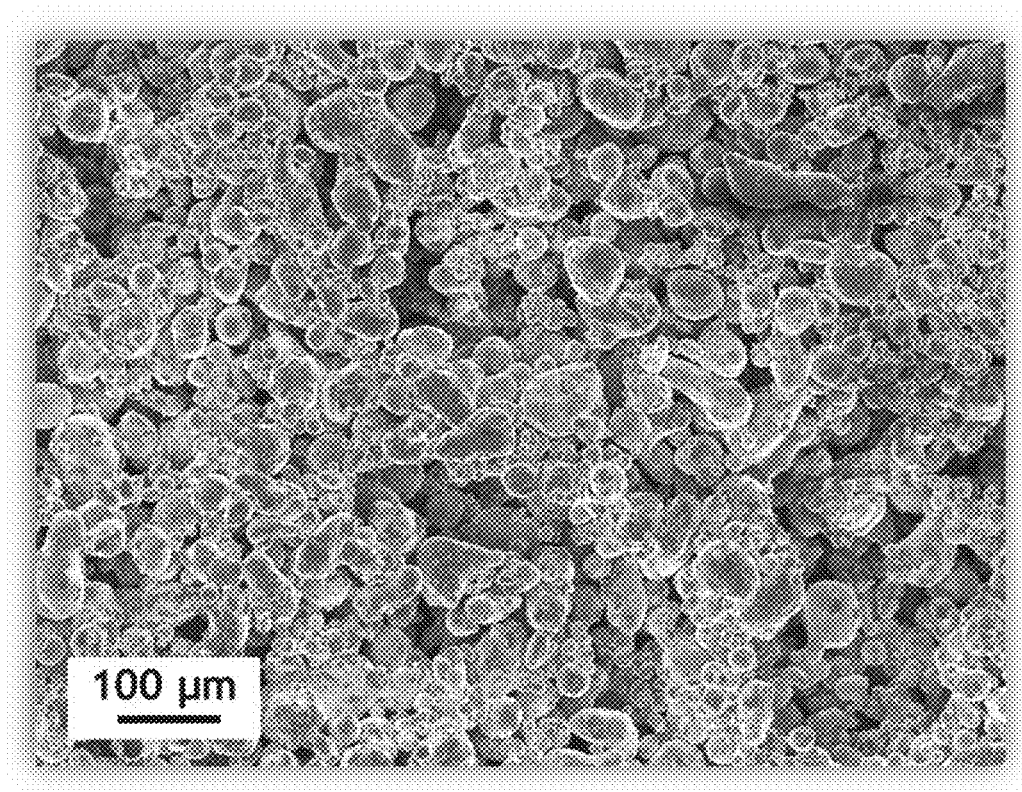
FIG. 7 shows a scanning electron micrograph of a chemically sintered zinc electrode (fabricated according to Method 2). The micrograph shows an internal surfaces exposed by removing a slice from a rod-shaped zinc monolith. Magnification: 250×.
Figure 8:
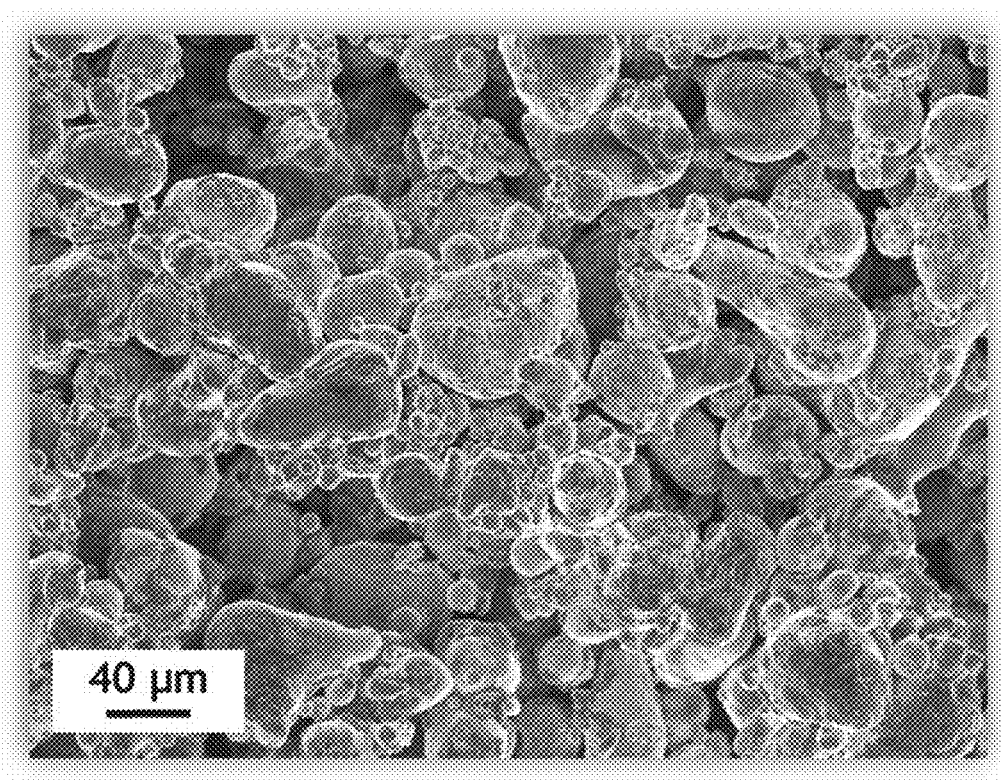
FIG. 8 shows a scanning electron micrograph of a chemically sintered zinc electrode (fabricated according to Method 2). The micrograph shows an internal surfaces exposed by removing a slice from a rod-shaped zinc monolith. Magnification: 500×.
Figure 9:
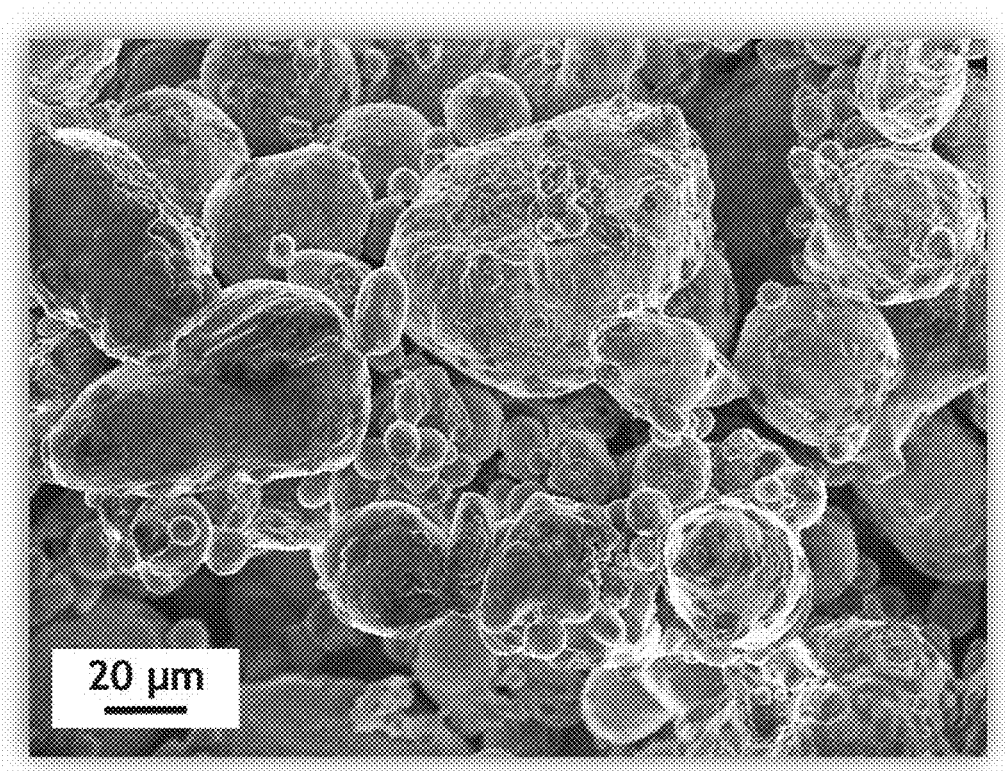
FIG. 9 shows a scanning electron micrograph of a chemically sintered zinc electrode (fabricated according to Method 2). The micrograph shows an internal surfaces exposed by removing a slice from a rod-shaped zinc monolith. Magnification: 1000×.
Figure 10:
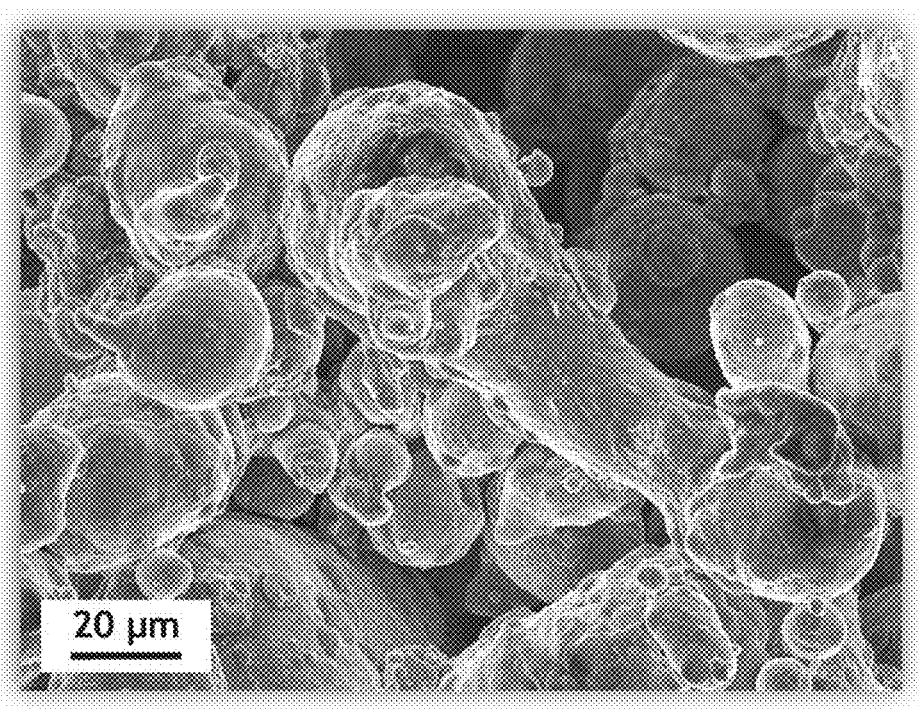
FIG. 10 shows a scanning electron micrograph of a chemically sintered zinc electrode (fabricated according to Method 2). The micrograph shows an internal surfaces exposed by removing a slice from a rod-shaped zinc monolith. Magnification: 1500×.

Electrochemical testing of the disclosed Zn monoliths demonstrates high discharge capacity (in Zn-air and silver-zinc (Ag—Zn) cells) and rechargeability (in nickel-zinc (Ni—Zn) cells). In primary discharge tests (FIGS. 4, 5), the achievable capacity is determined to be 500-550 mAh g$^{-1}$, which is 60-68% of theoretical zinc discharge capacity. While a promising capacity compared to conventional zinc electrodes, these results suggest that some ZnO remains, limiting available zinc metal for extreme high-energy battery discharge. Prototype Ni—Zn cells utilizing Zn anodes from the disclosed method and harvested NiOOH cathodes from commercial cells demonstrate rechargeability and capacity retention at 20% depth of discharge (DOD) (FIG. 6) over 25 cycles at 100% coulombic efficiency.

Method 2: Inorganic Template with Chemical Fusion of Zinc Particles

Disclosed is a sintering strategy that chemically, rather than thermally, fuses zinc particles together into a 3D network. This process involves introducing acetic acid to the zinc fabrication protocol, either before or after mixing with appropriate porogens. When exposed to acetic acid, the native, adventitious surface oxide of the zinc powder dissolves and initiates a self-exchange mechanism with the zinc metal surfaces (Yan et al. (2015) *RSC Adv.* 5, 83781-83797; Stock et al. (2018) *ACS Appl. Energy Mater.* 1, 5579-5588). This process removes ZnO as $Zn^{2+}$ and redeposits those species as Zn metal, often at junctions where Zn particles meet, thereby bridging those particles together.

Figure 11:
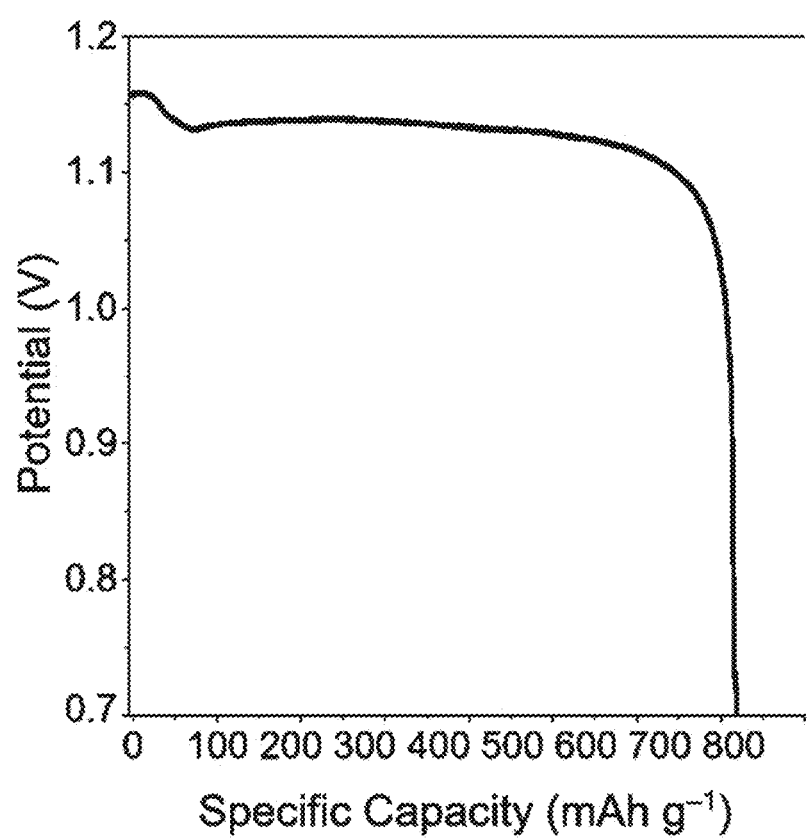
FIG. 11 shows primary discharge of zinc electrode in a Zn-air cell. Cathode: 4:1:1 mixture acetylene black carbon:cryptomelane MnOx aerogel catalyst:PTFE binder; anode: zinc sponge electrode fabricated according to Method 2.

In one embodiment, 28 g of Zn powder is mixed with 5 g of zinc acetate dihydrate. After homogenization, 3 mL of 5% acetic acid is added. After achieving a uniform mixture, the viscous paste is molded into the desired shape and dried overnight at 50-70° C. To remove the zinc acetate, zinc monoliths are soaked in water or ethanol for 2 h between room temperature and 60° C. Vacuum may be utilized to exfiltrate zinc acetate out of large-form monoliths. The acetic-acid treatment is sufficient to fuse zinc particles (FIGS. 7-10) and form monoliths that can be electrochemically discharged in Zn-air cells (FIG. 11).

In another embodiment, 27 g of Zn powder is mixed with 2 mL of 5% acetic acid and mixed thoroughly. The zinc powder is then filtered using a vacuum flask and washed with ethanol. Five grams of finely ground zinc acetate dihydrate is then mixed with the zinc powder. In a separate beaker, 4 mL of water and 50 mg of high-viscosity CMC (Sigma Aldrich, C5013) are mixed. After achieving uniform mixtures, the dry powders are mixed into the CMC-thickened water solution until homogenous. The viscous paste is then molded into the desired shape and dried overnight at 50-70° C. To remove the zinc acetate, zinc monoliths are soaked in water or ethanol for 2 h between room temperature and 60° C. Vacuum infiltration may be utilized to dissolve zinc acetate out of large-form monoliths.

In another embodiment, $CaCO_3$ porogen is used in conjunction with both chemical and thermal sintering. This process includes pretreating the zinc powder with acetic acid, mixing with calcium carbonate porogen, and then heat treating in an atmosphere of flowing inert gas (e.g., nitrogen or argon) at a lower temperature than the melting point of zinc (such as 400° C.) for a short period of time (e.g., 0.5-2 h). It has been found that the acetic-acid treatment of zinc allows for sufficient softening of the zinc below its melting point (419° C.). In contrast, zinc without acetic acid treatment needs to be heated to nearly 600° C. to form structurally sound monoliths.

Prototype cells utilizing zinc anodes (Method 2) and NiOOH cathodes harvested from commercial cells demonstrate impressive rechargeability and capacity retention at 20% DOD. If zinc acetate porogen is not removed before cell construction, 50 cycles are obtained at 100% efficiency before performance decay (FIG. 12). In contrast, if zinc acetate is removed by washing with water before cell construction, significantly prolonged and improved performance is observed (FIG. 13). The cell used for FIG. 13 ran for >150 cycles before coulombic efficiency dropped below 100%, and lasted >200 cycles and 2 months in cell before dropping below 85%.

The methods described herein and in U.S. Pat. Nos. 9,802,254; 10,008,711; 10,720,635; 10,763,500; 10,804,535; 11,069,889; 11,296,373; and 11,670,759 can be applied to metals other than zinc for fabrication of porous, interconnected monoliths relevant to aqueous batteries. Silver is commonly employed as a high-rate cathode in conjunction with a zinc anode and can be manufactured using these methods. Inspired by advances with zinc sponges, similar fabrication methods have been adapted to produce analogous three-dimensional, metallic silver sponges, with the goal of using these as cathodes in Ag—Zn batteries (paired with the zinc sponge), and also for use as chloride-capturing electrodes in desalination applications mediated by the Ag/AgCl redox couple.

Silver oxide powder and an inorganic pore-forming agent (porogen) are mixed, molded, and then heated to 700° C. to form a sturdy monolith. The porogen is then removed by dissolution in water. Either silver (I) oxide or silver (II) oxide can be used as precursors because both decompose into silver metal upon heating to temperatures >300° C. A wide range of porogens can be used, but these must be thermally stable, easily removable (e.g., by dissolution/extraction), and not detrimentally reactive with silver oxides.

In general, a mixture is made of first particles comprising silver or silver oxide and second particles comprising an inorganic porogen. The mixture may optionally comprise aqueous potassium hydroxide to more easily incorporate a current collector such as a mesh or grid into the electrode. The mixture is molded and cohered into a green body such that the particles adhere to each other enough to enable removing green body from the mold while maintaining its overall shape. The cohering may be performed, for example, by pressing. The monolith is demolded or released from the mold, and heated to form a monolith. The heating also converts any silver oxide to silver and fuses the first particles together. The resulting monolith is then submerged in a liquid that removes the second particles by dissolution. The method may be used to make an electrode that may be incorporated into an electrochemical cell.

The first particles may comprise metallic silver, $Ag_2O$, AgO, or any combination thereof. The second particles may comprise, for example, sodium chloride. The weight ratio of first particles to second particles may be from 1:4 to 4:1. The liquid to remove the second particles may be, for example, water. The heating may be to at least 300° C. or 700° C.

As an example, a silver sponge is fabricated using a 2:1 ratio of silver (I) oxide to sodium chloride by weight. The two powders are ground together with a mortar and pestle then pressed into a pellet at 4 metric tonnes. The composite is heated at 700° C. for 1 hour in air to convert silver oxide into silver metal and fuse silver particles together to provide particulate necking and mechanical robustness. After cooling to room temperature, the sodium chloride porogen is removed by repeated rinsing in 7° C. water. The resulting silver sponge is a durable monolithic object (FIG. 14, left) that can be handled and cut to desired dimensions. Monolith porosity (FIG. 14, right) is controlled by varying the ratio of silver oxide to porogen. In the present example of 2:1 silver (I) oxide to sodium chloride, primary pores established by the size of the sodium chloride particles are on the order of tens of micrometers (FIG. 15). For the case of silver (I) oxide and sodium chloride, silver sponges have been fabricated using ratios from 1:4-4:1 (w:w).

In addition to pressing powders into pellet form, a variety of shapes can be fabricated by making a paste of silver (I) oxide and sodium chloride with small amounts of 1 M KOH. This paste can be molded directly into various form factors or pressed into current collector meshes/grids.

Silver-sponge monoliths can serve directly as electrodes in various electrochemical devices including batteries and electrochemical desalination systems. As a demonstration of electrochemical function, a silver-sponge working electrode (1 cm$^2$) was tested in a three-electrode cell also containing a platinum-wire counter electrode, a Ag|AgCl reference electrode, and an electrolyte of 600 mM NaCl in water. In comparison to planar silver foil, the 3D silver sponge electrode exhibits orders of magnitude higher chloridation capacity when oxidized under constant-current conditions (FIG. 16), proceeding according to the electrochemical reaction, $Ag(s)+Cl^-(aq)$ AgCl $(s)+e^-$. The high capacity recorded for the silver sponge derives from (1) its high surface area, (2) the accessibility of that surface, particularly the interior surface, to ions from the electrolyte that easily infiltrate the sponge, and (3) the electronic conductivity of the silver-sponge scaffolding.

Electrochemical chloridation at silver electrodes can be exploited for faradaic desalination of water (Srimuk et al., Low voltage operation of a silver/silver chloride battery with high desalination capacity in seawater. RSC Adv. 9 (2019) 14849-14858; Ahn et al., High performance electrochemical saline water desalination using silver and silver-chloride electrodes. Desalination 476 (2020) 114216). To demonstrate the prospective capability of the architected silver sponge for electrochemical desalination, a symmetric two-electrode cell with 2.5 cm×2.5 cm sponges adhered to titanium current collectors was fabricated (FIG. 17). In this case, one electrode is chemically chloridated prior to cell assembly. Chemical prechloridation is achieved by simply soaking the sponge in 10-15% sodium hypochlorite solution for ~1 hour. Post-treatment X-ray diffraction confirms that this chemical process converts the purely metallic silver sponge into ~53% AgCl and ~47% Ag (FIG. 18), a desirable ratio for maintaining a metallic, networked core of conductive silver while optimizing chloridation capacity. Flow-through electrodes separated by a cation-exchange membrane (CEM) were cycled galvanostatically between ±1 V in 48 L m$^{-2}$ batches of 600 mM NaCl solution (approximate salinity of seawater) at a flow rate of 1000 L m$^{-2}$h$^{-1}$. Desalination occurs through electrochemical choridation of Ag with chloride ions from solution accompanied by diffusion of sodium cations across the CEM to balance the reduction of the AgCl counter electrode. In such operation, the silver-sponge-equipped desalination cell maintains a high salt absorption capacity (SAC) of ~90 mg$_{NaCl}$ g$_{electrode}^{-1}$ under flowing electrolyte conditions (Table 1; FIG. 19), even at high applied current density (50 A m$^{-2}$-500 A m$^{-2}$). Energy consumption for desalination is low due to the high conductivity of the silver sponge and its efficient flow-through characteristics. The high desalination capacity and absorption rate make silver sponge architectures attractive for electrochemical desalination of seawater.

TABLE 1

Results of desalination electrochemistry.

| Current (A/m$^2$) | SAC (mg$_{NaCl}$/g) | Energy (Wh/g$_{NaCl}$) |
|---|---|---|
| 50 | 87 | 0.054 |
| 100 | 89 | 0.123 |
| 200 | 85 | 0.226 |
| 500 | 90 | 0.459 |

SAC: salt absorption capacity.

These same structural characteristics also make silver sponges effective when used as cathodes in alkaline Ag—Zn batteries. Prior to assembly of Ag—Zn batteries, the surface of the silver sponge may be chemically oxidized to silver (I) and/or silver (II) oxide using such agents as permanganate, persulfate, or ozone, in a manner similar to that described above for oxidative chloridation with hypochlorite. Alternatively, the silver sponge may be electrochemically oxidized, typically in aqueous alkaline electrolyte. The oxidized silver sponge could then be paired with a metallic zinc sponge anode in a fully assembled Ag—Zn cell. To demonstrate the prospective capability of the architected silver sponge for electrochemical energy storage, including pulse power, a Ag-sponge/Zn-sponge cell is fabricated with 5 cm$^2$ electrodes in 9 M KOH electrolyte. The cell is first charged at 50 mA and then discharged at various currents in steps of 1 mAh capacity (FIG. 20).

These preliminary results demonstrate the electrochemical functionality of NRL silver-sponge electrodes, taking advantage of their form factor and 3D-wiring of electrons, ions, and solution to enhance ion-storage capacity and dynamic response for silver-based redox reactions.

Many modifications and variations are possible in light of the above teachings. It is therefore to be understood that the claimed subject matter may be practiced otherwise than as specifically described. Any reference to claim elements in the singular, e.g., using the articles "a", "an", "the", or "said" is not construed as limiting the element to the singular.

What is claimed is:

1. A method comprising:
   providing a mixture comprising:
   first particles comprising silver or silver oxide;
   second particles comprising an inorganic porogen; and
   aqueous potassium hydroxide;
   molding the mixture;
   cohering the mixture to form a green body;
   demolding the green body;
   heating the green body to form a monolith, to convert any silver oxide to silver, and to fuse the first particles together; and
   submerging the monolith in a liquid that removes the second particles.

2. The method of claim 1, wherein the first particles comprise metallic silver.

3. The method of claim 1, wherein the first particles comprise $Ag_2O$.

4. The method of claim 1, wherein the first particles comprise AgO.

5. The method of claim 1, wherein the monolith is heated at least 300° C.

6. The method of claim 1, wherein the monolith is heated at least 700° C.

7. The method of claim 1, wherein the second particles comprise sodium chloride.

8. The method of claim 7, wherein the liquid is water.

9. The method of claim 1, wherein molding and cohering the mixture includes incorporating a current collector into the green body.

10. The method of claim 1, wherein the weight ratio of first particles to second particles is from 1:4 to 4:1.

* * * * *